Figure 1:
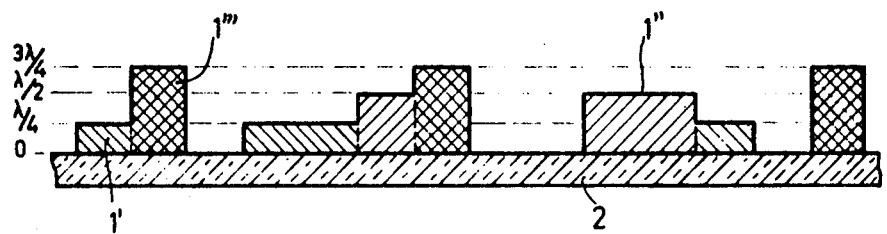

United States Patent

[11] 3,623,786

| | | |
|---|---|---|
| [72] | Inventor | Hans Dammann<br>Schonberg Rauhbank, Germany |
| [21] | Appl. No. | 747 |
| [22] | Filed | Jan. 5, 1970 |
| [45] | Patented | Nov. 30, 1971 |
| [73] | Assignee | U.S. Philips Corporation<br>New York, N.Y. |
| [32] | Priority | Jan. 4, 1969 |
| [33] | | Germany |
| [31] | | P 19 00 344.2 |

[54] SYNTHETIC PHASE HOLOGRAM
6 Claims, 2 Drawing Figs.

[52] U.S. Cl. .................................................. 350/3.5
[51] Int. Cl. ........................................... G02b 27/22
[50] Field of Search .......................................... 350/3.5

[56] References Cited
OTHER REFERENCES

Rigler, J. Opt. Soc. Am., Vol. 55, No. 12, p. 1693 (12/1965)
Lesem et al. Communications of the ACM, Vol. 11, No. 10 pp. 661–674 (10/1968).

*Primary Examiner* — David Schonberg
*Assistant Examiner* — Robert L. Sherman
*Attorney* — Frank R. Trifari ABSTRACT: A synthetic hologram made up of groups of rectangular elements each group extending a different distance above a substrate, where the distances of the groups of elements above the substrate are equal to interval multiples of one-fourth wavelength of the radiation used to reconstruct the hologram.

PATENTED NOV 30 1971　　　　　　　　　　3,623,786

INVENTOR.
BY　HANS　DAMMANN
AGENT

SYNTHETIC PHASE HOLOGRAM

The invention relates to a synthetic phase hologram. Such a hologram is used for the reconstruction of optical wave fronts.

It is known (see Applied Optics, 6, (1967), pages 1739-1748) to make synthetic phase holograms by the roundabout way of computed black-and-white holograms (amplitude holograms). These black-and-white holograms have a binary structure, i.e. their absorptivity at the various points of the hologram can assume only two discrete values, ideally the two values zero percent and 100 percent. This computed black-and-white structure is recorded on a photographic plate and serves as a normal amplitude hologram. By bleaching the photographic emulsion of the plate, this amplitude hologram can be converted into a phase hologram, which exactly like the amplitude hologram has a binary structure, i.e., apart from the fundamental step it contains only one further phase step.

However, a reconstruction by means of a phase hologram used in the aforementioned manner is not optimal. Firstly, the imaging efficiency is limited by the binary structure; the theoretical maximum lies at 40 percent. Secondly, the image quality as a rule is very poor, since with increasing efficiency an increasing number of interference images are superposed on the image by intermodulation. This interference is due to the fact that the phase structure employed is built up in accordance with the intensity of the respective light distribution.

It is an object of the invention to avoid these disadvantages. For this purpose it characterized in that the phase relief of the image to be reconstructed, which phase relief is computed as a step function, is composed of a plurality of rectangular optical elements having equal discrete heights, these discrete heights being fractional parts of a wavelength of the light used for the reconstruction. The term optical elements as used hereinafter refers to a member composed of a refracting or reflecting substance.

Since stepped phase structures having more than one phase step can be used, the efficiency can be increased, for example to about 80 percent, by using three steps (in addition to the fundamental step). Further, the arrangement of these steps is chosen so that interference images due to intermodulation are largely suppressed, because in contradistinction to the conventional method the phase structure is not built up in accordance with the intensity distribution of the light, but is directly computed and manufactured so as to satisfy the image requirements in an optimum manner. As a matter of fact, the special manner of computing and manufacturing ensures that the greater part of the light which in reconstruction is used for illuminating the hologram also provides a contribution to the wave front to be reconstructed, so that with this hologram the efficiency of the image formation is very high, for example 80 percent.

The starting point in the production of phase holograms according to the invention is the given distribution of the light intensity in the image plane, i.e. the image to be reconstructed. Hence, with finite dimensions of the given image and of the hologram it is sufficient to prescribe the intensity in the image in a finite number of sampling points, for example at the crossing points of a two-dimensional grating. By means of an electronic computer the problem of finding an associated optimum phase relief is then solved. For this purpose a special method may be used which has already successfully been used in an example of a Fraunhofer phase hologram. In this method, in which the above-mentioned sampling points in the image are arranged in the form of a square matrix, the likewise square hologram area is divided into small rectangular area which cover the entire hologram. The area may alternatively be square. In computing, each elementary rectangle of the hologram is assigned a given phase change, i.e., a given relief height. In particular, it is possible to admit only discrete values of this relief height, and this considerably facilitates the manufacture of such holograms in practice.

Figure 2:
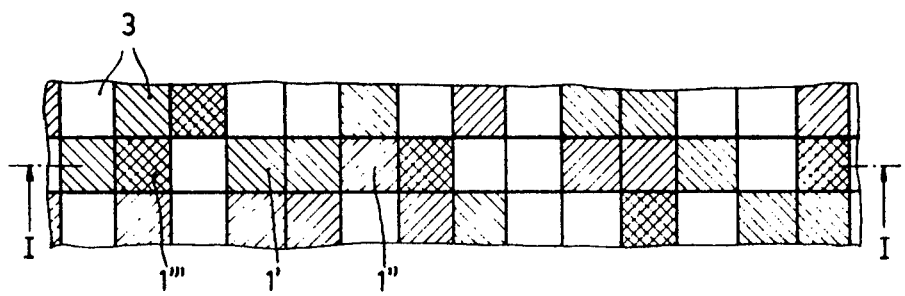

An embodiment of the invention will now be described, by way of example, with reference to the accompanying diagrammatic drawings, in which:

FIG. 1 is a cross-sectional view of a phase hologram according to the invention, and FIG. 2 is a plan view thereof.

Referring now to the Figures, the said discrete values are 0, $\lambda/4$, $2\lambda/4$ and $3\lambda/4$ ($\lambda$= the wavelength of the light used in the reconstruction). The phase relief may be manufactured by applying layers $1'$, $1''$ and $1'''$ of suitable thicknesses to a glass substrate 2 by deposition from vapor with the use of masks to provide spatial separation of the individual elementary areas in the hologram, which are shown as squares 3. In FIG. 2, the thickest part of the layer are designated by $1'''$ (crosshatched) and the thinnest by $1'$ (hatched from left to right), the intermediate layer thickness (hatched from right to left) being designated by $1''$.

With the use of general step functions the holograms may also be made so as to have nonlevel steps. For example, the relationship between image quality and efficiency may be influenced by a slight absorption in the hologram. The holograms may be produced not only for transmission, but also for reflection. Further, in order to avoid high-spatial frequencies in the hologram with consequent facilitation of manufacture, the holograms may directly be applied to the surfaces of lenses, mirrors and the like.

What is claimed is:

1. A synthetic phase hologram for use with a reconstruction radiation having a particular wavelength, comprising a substrate, a first plurality of rectangular optical elements extending a distance above the substrate equal to a fractional part of the wavelength of the reconstruction radiation, and a second plurality of rectangular optical elements extending a distance above the substrate equal to a different fractional part of the wavelength of the reconstruction radiation.

2. A synthetic phase hologram as claimed in claim 1, wherein the surfaces of the different rectangular optical elements remote from the substrate lie in nonparallel planes.

3. A synthetic phase hologram as claimed in claim 1, further comprising absorption portions.

4. A synthetic phase hologram as claimed in claim 3, wherein the absorption portions comprise a separate hologram arranged in the path of the reconstruction radiation.

5. A synthetic phase hologram as claimed in claim 1, wherein the surfaces of the rectangular optical elements remote from the substrate and the surfaces of the substrate are reflecting surfaces.

6. A synthetic phase hologram as claimed in claim 1, wherein the substrate comprises the surface of an optical device.

* * * * *